US010254834B2

(12) United States Patent
Jean

(10) Patent No.: US 10,254,834 B2
(45) Date of Patent: *Apr. 9, 2019

(54) SYSTEM AND METHOD FOR GENERATING IDENTIFIERS FROM USER INPUT ASSOCIATED WITH PERCEIVED STIMULI

(71) Applicant: Diemsk Jean, Miami, FL (US)

(72) Inventor: Diemsk Jean, Miami, FL (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/344,917

(22) Filed: Nov. 7, 2016

(65) Prior Publication Data

US 2017/0052590 A1    Feb. 23, 2017

Related U.S. Application Data

(63) Continuation-in-part of application No. 14/547,266, filed on Nov. 19, 2014, now Pat. No. 9,503,504.

(51) Int. Cl.
| | |
|---|---|
| *G06F 3/0484* | (2013.01) |
| *G06F 3/01* | (2006.01) |
| *H04L 29/08* | (2006.01) |
| *G06F 17/28* | (2006.01) |
| *G06F 16/23* | (2019.01) |
| *G06F 17/22* | (2006.01) |
| *G06F 17/27* | (2006.01) |
| *G06T 19/20* | (2011.01) |

(52) U.S. Cl.
CPC ............ *G06F 3/015* (2013.01); *G06F 3/0484* (2013.01); *G06F 16/23* (2019.01); *G06F 17/2247* (2013.01); *G06F 17/275* (2013.01); *G06F 17/289* (2013.01); *H04L 67/02* (2013.01); *G06F 2203/011* (2013.01); *G06T 19/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,885,083 A | * | 3/1999 | Ferrell | G09B 5/065 434/156 |
| 8,306,356 B1 | * | 11/2012 | Bever | G06K 9/723 382/275 |
| 2004/0023191 A1 | * | 2/2004 | Brown | G09B 7/077 434/156 |

(Continued)

*Primary Examiner* — Hien L Duong
(74) *Attorney, Agent, or Firm* — James M. Smedley LLC; James Michael Smedley, Esq.

(57) ABSTRACT

The present invention generally relates to systems for generating identifiers. In particular, the systems and methods herein are configured to generate visual and/or aural identifiers for representing user response to stimuli. In a preferred embodiment, visual identifiers are generated from primary colors or shapes, wherein the primary colors and/or shapes can be blended or modified based on strength/weakness of the stimuli experienced by a user or across a plurality of users, while aural identifiers are generated from musical notes from any source such as preprogrammed stored notes or notes played live. Preferred embodiments of the invention are further configured to receive text or other non-visual identifier from a user in order to describe the response the user has to a stimuli; wherein the associated system is configured to convert the described response into an appropriate identifier.

15 Claims, 9 Drawing Sheets

(56) References Cited

U.S. PATENT DOCUMENTS

| | | | | |
|---|---|---|---|---|
| 2011/0314559 A1* | 12/2011 | Jakobsson | ............... | G06F 21/36 |
| | | | | 726/28 |
| 2012/0290266 A1* | 11/2012 | Jain | ....................... | G16H 40/63 |
| | | | | 702/187 |
| 2013/0304451 A1* | 11/2013 | Sarikaya | ............... | G06F 17/289 |
| | | | | 704/2 |
| 2014/0186806 A1* | 7/2014 | Hallowell | .............. | A61B 3/112 |
| | | | | 434/167 |
| 2014/0342321 A1* | 11/2014 | Wendt | ....................... | G09B 7/06 |
| | | | | 434/156 |
| 2018/0107344 A1* | 4/2018 | Crain | .................. | G06Q 10/109 |

\* cited by examiner

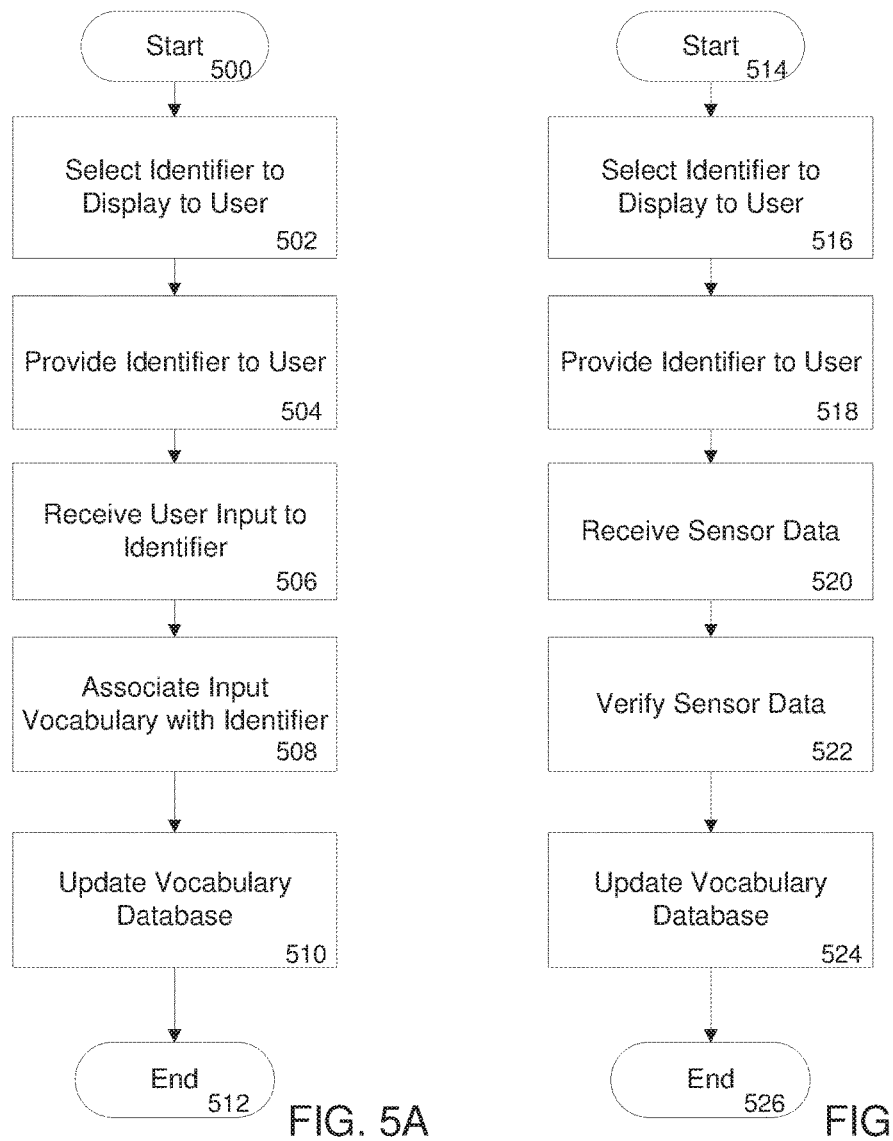

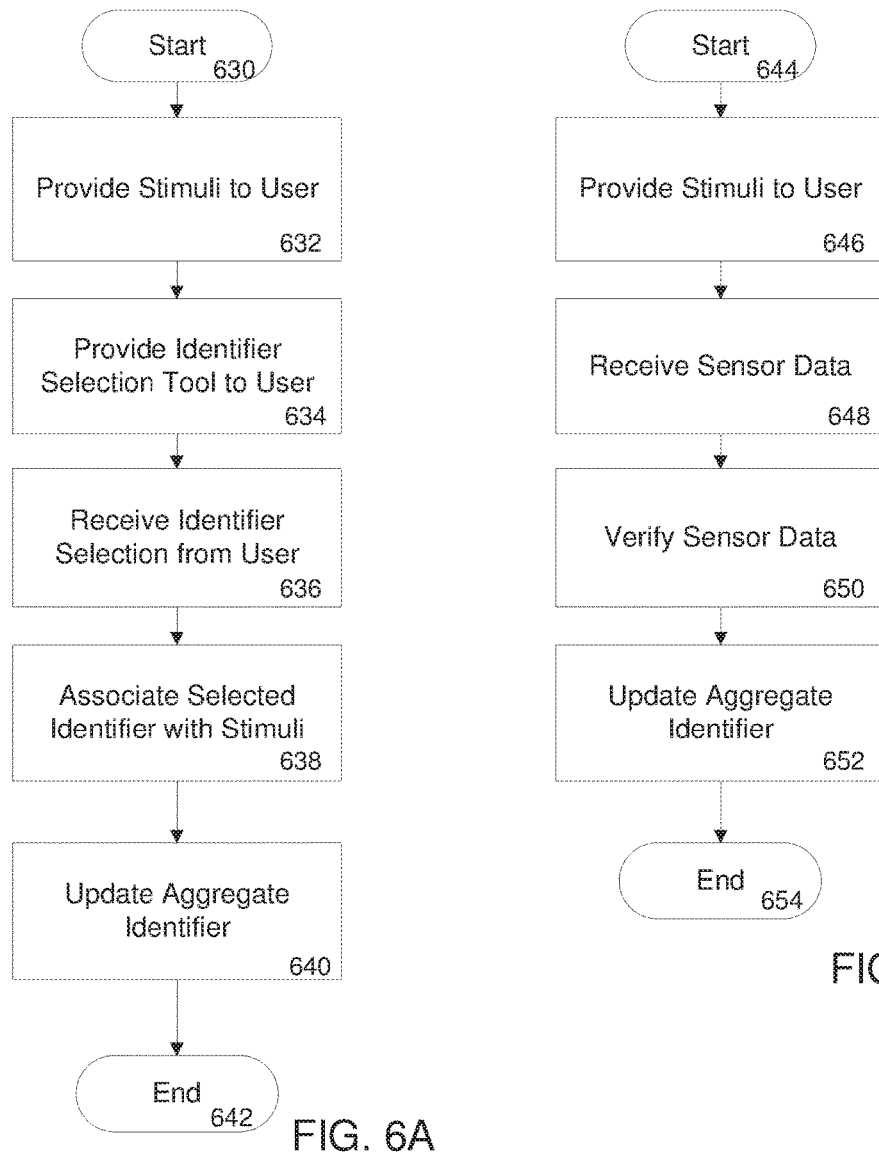

SYSTEM AND METHOD FOR GENERATING IDENTIFIERS FROM USER INPUT ASSOCIATED WITH PERCEIVED STIMULI

CROSS-REFERENCE TO RELATED APPLICATIONS

This application is a continuation-in-part of U.S. Non-Provisional Utility patent application Ser. No. 14/547,266, filed on Nov. 19, 2014 and entitled "SYSTEM AND METHOD FOR GENERATING VISUAL IDENTIFIERS FROM USER INPUT ASSOCIATED WITH PERCEIVED STIMULI", the entire disclosures of each and all of the above mentioned references are hereby incorporated herein by reference

FIELD OF THE INVENTION

The present invention generally relates to systems for generating identifiers. In particular, the systems and methods herein are configured to generate identifiers for representing user response to stimuli. In a preferred embodiment, identifiers can be generated from visual symbols (such as primary colors or shapes) and/or aural sounds (such as musical notes), wherein each symbol and/or sound can be blended or modified based on strength/weakness of the stimuli experienced by a user or across a plurality of users. Preferred embodiments of the invention are further configured to receive text or other non-visual identifier from a user in order to describe the response the user has to stimuli; wherein the associated system is configured to convert the described response into an appropriate visual identifier.

BACKGROUND

Association between visual identifiers, such as colors and shapes, have long been associated with stimuli experienced by individuals. When describing stimulus, such as emotions (e.g., anger, calmness, stress, happiness, passion), physical sensations (e.g., nausea, pain, tension, lightness, hyperactivity of muscles/joints) or other stimuli perceived or experienced by an individual, a common representation is a basic visual representation that arouses similar sensations. For instance, colors and shapes are frequently used to identify stimulus experienced by individuals. An example of this is a mood ring, which changes color based on an underlying "mood" of the wearer.

Research has indicated that certain colors can be almost universally associated with particular stimuli, regardless of variances in individuals. Further, certain colors can also cause individuals to experience related stimuli that the individual associates with that color. For instance, studies have shown that warm colors, such as orange and yellow, can elicit a hunger response and are associated with food.

In most cases, individuals currently use numbers and vocabulary to describe and define responses to stimuli. When asked to describe how an individual feels about something, they may be asked to describe it in words, or provide input on a numeric scale (e.g., 1 through 10). However, since numbers and vocabulary can be a restrictive tool for measuring stimuli, such as emotions, moods, emotional intelligence, and because words can be subjective and have different interpretations, depending on variables such as context and background of the individual (e.g., socioeconomic background, education level, native language), describing such stimuli can be difficult given its dynamic nature.

Since stimuli can be accurately represented across individuals through colors and other visual identifiers, it would be advantageous to have a system that could receive input from individuals on a stimuli and output an accurate representation of that stimuli in a visual identifier. However, there are currently no systems or methods for generating visual identifiers from user input associated with perceived stimuli.

Therefore, there is need in the art for systems and methods for generating visual identifiers from user input associated with perceived stimuli. These and other features and advantages of the present invention will be explained and will become obvious to one skilled in the art through the summary of the invention that follows.

SUMMARY OF THE INVENTION

Accordingly, it is an aspect of the present invention to provide a system and method for generating identifiers from user input associated with perceived stimuli.

According to an embodiment of the present invention, a web-based system for generating identifiers from user input associated with perceived stimuli includes: an input classification module comprising computer-executable code stored in non-volatile memory; a identifier generation module comprising computer-executable code stored in non-volatile memory; a communications means comprising computer-executable code stored in non-volatile memory, and a processor, wherein said input classification module, said identifier generation module, said processor and said communications means are operably connected; and wherein said input classification module, said identifier generation module, said processor and said communications means are configured to collectively: present or expose a user with a stimuli; receive user input related to said stimuli, wherein at least a portion of said user input is based on text, visual, aural, olfactory, gustatory, sensory or hepatic input; convert said input into language component data; analyze said language component data for one or more corresponding identifiers; and generate a final identifier based on analysis of said language component data, wherein said generated identifier may be in at least one of a visual and aural form.

According to an embodiment of the present invention, the input is in the form of at least one of a visual, aural, olfactory, gustatory, haptic and sensory input.

According to an embodiment of the present invention, the web-based system generates an identifier that is in at least one of a visual and aural form.

According to an embodiment of the present invention, the input classification module, the identifier generation module, the processor and the communications means are further configured to collectively: retrieve one or more stored visual, aural, olfactory or thermal identifiers associated with said stimuli; and generate an aggregate identifier, wherein said aggregate identifier is based at least in part on said final identifier and said one or more stored identifiers.

According to an embodiment of the present invention, the input classification module, the identifier generation module, the processor and the communications means are further configured to collectively: receive sensor data from one or more sensors associated with the user; process said sensor data into one or more sensor data identifiers; compare sensor data identifier with said final identifiers; and generate an aggregate identifier, wherein said aggregate identifier is based at least in part on said final identifier and said one or more sensor data identifiers.

According to an embodiment of the present invention, the input classification module, the identifier generation module, the processor and the communications means are further configured to collectively: verify said final identifier corresponds to said sensor data identifier; update a vocabulary database associated with said identifier generation module based on said sensor data identifier.

According to an embodiment of the present invention, a web-based method for generating identifiers from user input associated with perceived stimuli, includes the steps of: presenting and/or exposing a user with a stimuli; receiving user input related to said stimuli; converting said input into language component data; analyzing said language component data for one or more corresponding identifiers; and generating a final identifier based on analysis of said language component data.

According to an embodiment of the present invention, the input of the web-based method is in the form of at least one of a visual, aural, olfactory, gustatory, haptic and sensory form.

According to an embodiment of the present invention, generated identifier may be in at least one of a visual and aural form.

According to an embodiment of the present invention, the method further includes the steps of: retrieving one or more stored identifiers associated with said stimuli; and generating an aggregate identifier, wherein said aggregate identifier is based at least in part on said final identifier and said one or more stored identifiers.

According to an embodiment of the present invention, the method further includes the steps of: receiving sensor data from one or more sensors associated with the user; processing said sensor data into one or more sensor data identifiers; comparing sensor data identifier with said final identifiers; and generating an aggregate identifier, wherein said aggregate identifier is based at least in part on said final identifier and said one or more sensor data identifiers.

According to an embodiment of the present invention, the method further includes the steps of: verifying said final identifier corresponds to said sensor data identifier; updating a vocabulary database associated with said identifier generation module based on said sensor data identifier.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 5A is a flowchart of an exemplary method in accordance with an embodiment of the present invention;

FIG. 5B is a flowchart of an exemplary method in accordance with an embodiment of the present invention;

FIG. 6A is a flowchart of an exemplary method in accordance with an embodiment of the present invention;

FIG. 6B is a flowchart of an exemplary method in accordance with an embodiment of the present invention.

DETAILED SPECIFICATION

The present invention generally relates to systems for generating visual and/or aural identifiers. In particular, the systems and methods herein are configured to generate identifiers for representing user response to stimuli. In a preferred embodiment, identifiers are generated from (i) primary colors or shapes, wherein the primary colors and/or shapes, (ii) musical notes, (iii) or a combination of both visual identifiers and aural identifiers, in each case (i)-(iii) the identifiers can be blended or modified based on strength/weakness of the stimuli experienced by a user or across a plurality of users. Preferred embodiments of the invention are further configured to receive a sensory identifiers (e.g. visual, aural, olfactory, gustatory, sensory, and haptic) from a user in order to describe the response the user has to a stimuli; wherein the associated system is configured to convert the described response into an appropriate visual and/or aural identifier.

Figure 1:
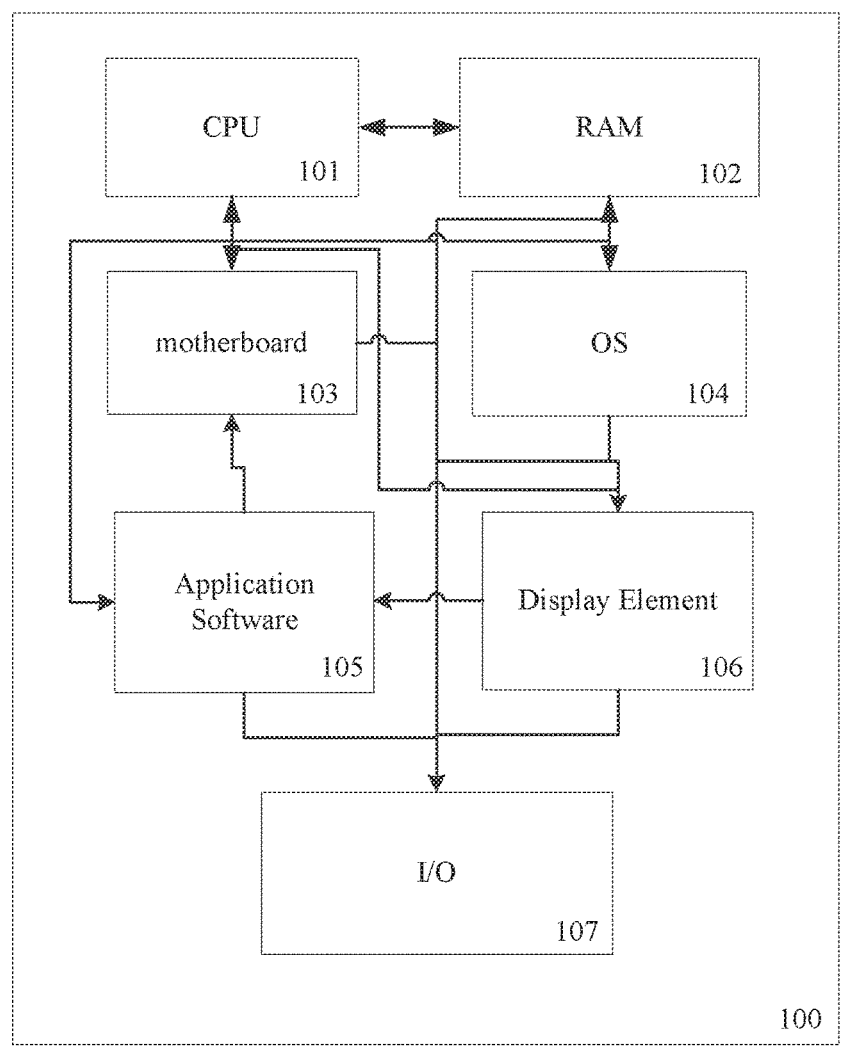
FIG. 1 illustrates a schematic overview of a computing device, in accordance with an embodiment of the present invention.

According to an embodiment of the present invention, the system and method is accomplished through the use of one or more computing devices (whether or not encompassing the internet of things (iOT), and/or communication & networking technologies and framework including wireless technologies (e.g. Bluetooth) and cloud computing. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, display element 106 and one or more input/output devices/means 107. Examples of computing devices usable with embodiments of the present invention include, but are not limited to, personal computers, smart phones, laptops, mobile computing devices and tablet PCs and servers. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
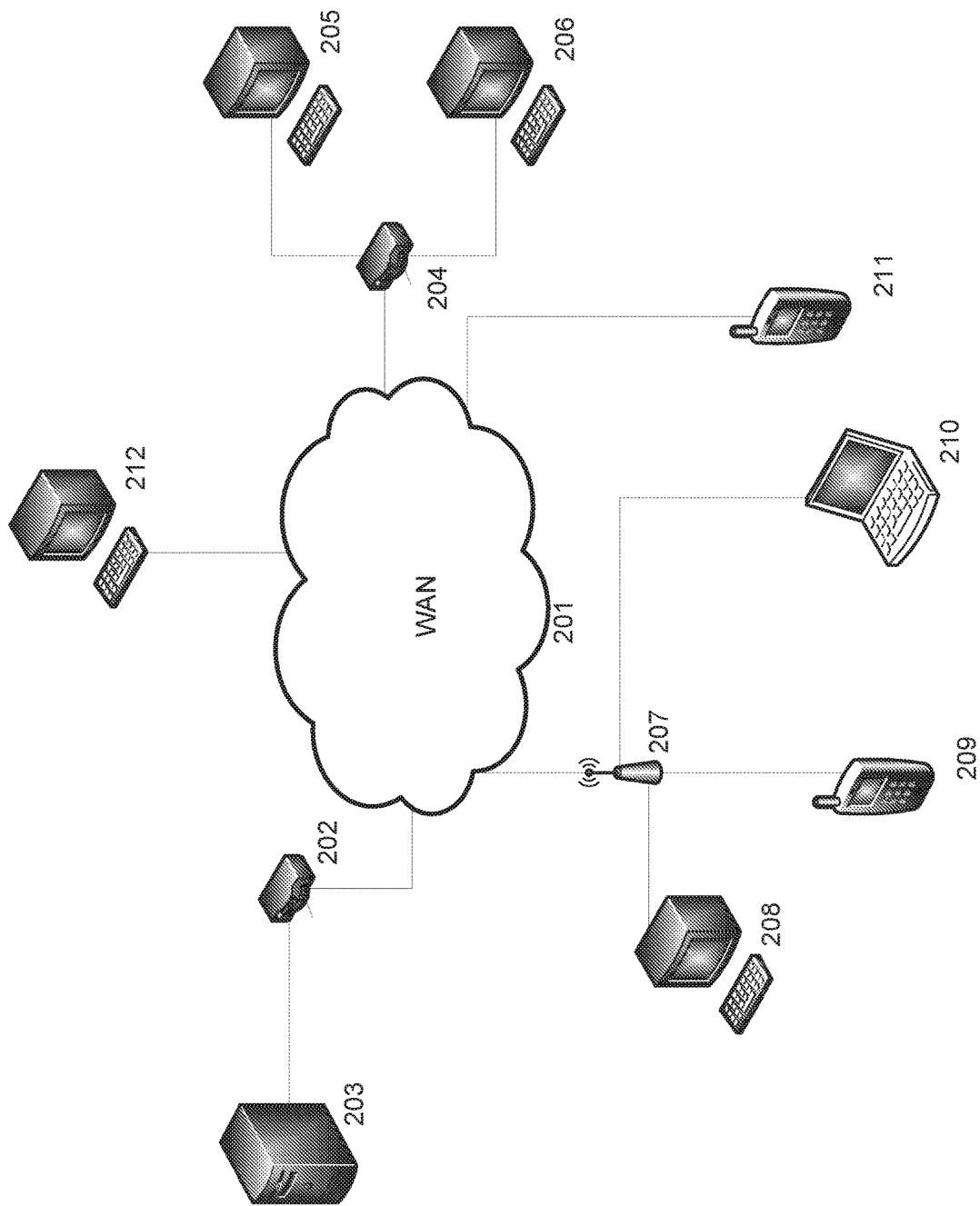
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

Figure 3:
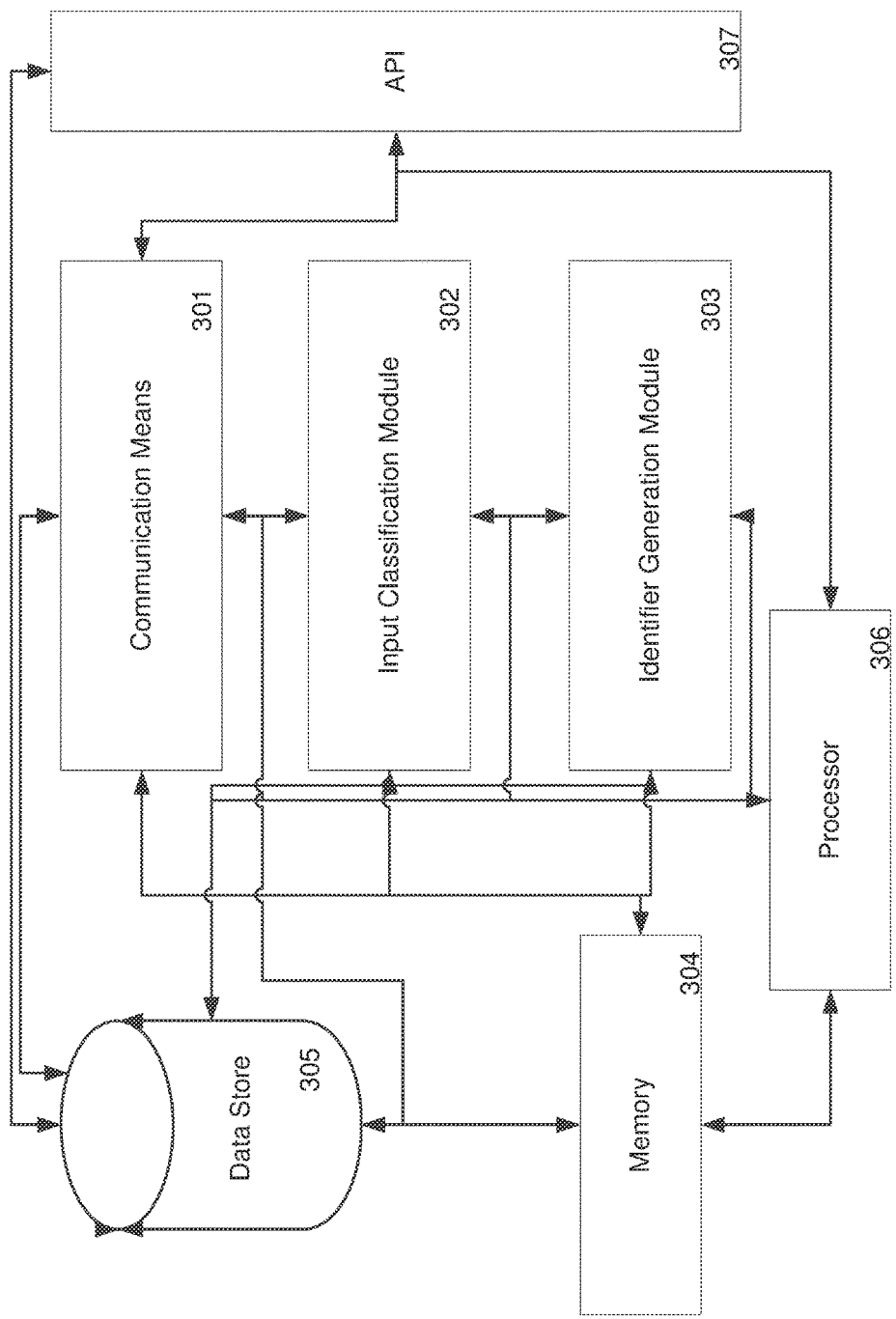
FIG. 3 is a schematic of a system for generating visual identifiers from user input associated with perceived stimuli, in accordance with an embodiment of the present invention.

Turning now to FIG. 3, an exemplary embodiment of a system for generating identifiers from user input associated with perceived stimuli is shown. In this embodiment, the system includes a communications means 301, an input classification module 302, an identifier generation module 303, a non-transitory memory module 304, a data store 305, a processor 306 and an application programming interface (API) 307. While the embodiment shown in FIG. 3 is an exemplary embodiment, other embodiments may include additional or fewer components. One of ordinary skill in the art would appreciate that there are numerous configurations of the components that could be utilized with embodiments of the present invention, and embodiments of the present invention are contemplated for use with any configuration of components.

According to an embodiment of the present invention, the communications means may be, for instance, any means for communicating data over one or more networks. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the input classification module 302 is configured interact with commands send and received from the user, including the receipt of input data and transmission of stimuli to a user. The input classification module 302 may be configured to interpret and process various types of input data. Input data may include, but is not limited to, text data, audio data, sensor data, visual data, olfactory data, gustatory data, sensory data, haptic (tactile) data or any combination thereof. As examples, text data may be received from a user using any appropriate input source, such as a keyboard or touchscreen device; audio data may be received from a user using any appropriate audio input source, such as a microphone, headset, or other audio device; sensor data is data received from one or more sensors that are receiving information about a user, such as, but not limited to, heart rate, neurotransmissions, brain waves, EKGs, perspiration levels, respiration rate, eye movement/dilation, or any combination thereof. One of ordinary skill in the art would appreciate that there are numerous types of sensors and input sources that could be utilized with embodiments of the present invention, and embodiments of the present invention are contemplated for use with any appropriate sensor type or input source.

According to an embodiment of the present invention, the identifier generation module 303 is configured to process input data related to stimuli presented to users into an identifier that represents the input data in a different form. The input data is generally provided to the identifier generation module 303 by the input classification module 302. However, in other embodiments, the modules may be combined or broken down into additional modules. One of ordinary skill in the art would appreciate there are numerous configurations that could be used with embodiments of the present invention, and embodiments of the present invention are contemplated for use with any appropriate configuration.

According to an embodiment of the present invention, the communications means 301, input classification module 302, identifier generation module 303, non-transitory memory module 304, data store 305, processor 306 and application programming interface (API) 307, work in conjunction with one another to provide the methods and functionality described herein. The collective grouping of these components, or any appropriate configuration thereof, being referable to as the system.

According to an embodiment of the present invention, the system is configured to use identifiers to describe or represent responses individuals have to stimuli. In a preferred embodiment of the present invention, the identifiers used by the system can be (i) visual in nature, such primary colors, simples shapes, (ii) aural musical notes and (iii) permutations thereof. Identifiers are intended to relate to stimuli merely by their form, as opposed to requiring words, text or other more common identifiers. For example, visual identifiers, such as colors, elicit a more standard reaction across individuals than, say for instance, text based identifiers; users who view visual identifiers provided by the system can get a more accurate identification of a stimulus. Similarly, for users who are more in tune with their aural capabilities, aural identifies such a musical notes on a scale can reflect a more accurate correlative response to a stimuli. Alternate embodiments of the current invention can generate other identifiers such as identifiers based on thermal perception (e.g. how hot or cold a sensation is), gustatory perception (e.g. based on a scale of sweetness, saltiness, and/or bitterness), and/or olfactory perception (e.g. intensity of a petrichor scent, floral scent, evergreen scent, etc.).

The term stimuli, as used herein, is defined as any output from a device that is intended to elicit a response from a user. Stimuli may include, but is not limited to visual stimuli, audible stimuli, tactile (haptic) stimuli, gustatory stimuli, sensory stimuli or any combination thereof. Visual stimuli includes visually perceptible output, such as color, art, text, graphics, or any other output that is perceived by the eyes of a user. Audible stimuli includes audibly perceptible output, such as music, speech, tones, or any other output that is perceived through the ears of a user. Tactile stimuli includes touch perceptible output, such as force feedback, temperature, grittiness, softness, wetness, or any other output that is perceived through the tactile sensory system of a user. In certain embodiments, the system may be configured to present one or more various types of stimuli to a user. Additional hardware may be required to provide stimuli to the user, such as force feedback systems, speakers/headphones, or display elements. One of ordinary skill in the art would appreciate that there are numerous types of such hardware that could be utilized with embodiments of the present invention, and embodiments of the present invention are contemplated for use with any appropriate type of stimuli presenting hardware.

In certain embodiments, the term stimuli may also be associated with events, situations or other experiences. For instance, the system may receive input related to stimuli, where the stimuli was an event (e.g., concert, vacation, visit to a doctor), a place (e.g., store, theme park ride), a series of interactions (e.g., playing of a video game), or any combination thereof. The system may be configured to capture the overall sentiment of these interactions. In certain embodiments, the system may be configured to receive and process real-time sentiment, such as by providing a visual identifier for stimuli across all users viewing a real-time event (e.g., political debate, sporting event, concert). One of ordinary skill in the art would appreciate there are numerous stimuli that could be utilized by embodiments of the present invention, and embodiments of the present invention are contemplated for use with any appropriate stimuli.

In a preferred embodiment of the present invention, the system provides one or more stimuli to a user in order to elicit input data from the user about the stimuli. The system then processes the input data into one or more identifiers that can be later used in conjunction with the stimuli or as an identifier for other users in association with the stimuli. For instance, a user may be provided with a song to listen to (i.e., stimuli) and after listening to the song, the user can provide input data about the song (e.g., text input and/or sensor input data) to the system. The system will then process the input data into an identifier (e.g., a color) and associate the corresponding identifier with the song. The next time user requests information about that song, the system can be used to provide the identifier to alert the requesting user about sensations the song may have elicited in other users. This process is described in greater detail below.

Further, in certain embodiments, the system may be configured to provide multiple identifiers for a particular event/item based on one or more stimuli provided by that event/item. For the sake of clarity, the identifier can be of either one form or multiple forms. For instance, a food may be given separate indicators for taste, smell, texture and appearance. One of ordinary skill in the art would appreciate that the system could utilize any number of identifiers for each item/event/stimuli, and embodiments of the present invention are contemplated for use with application of any number of identifier per item/event/stimuli.

Figure 7:
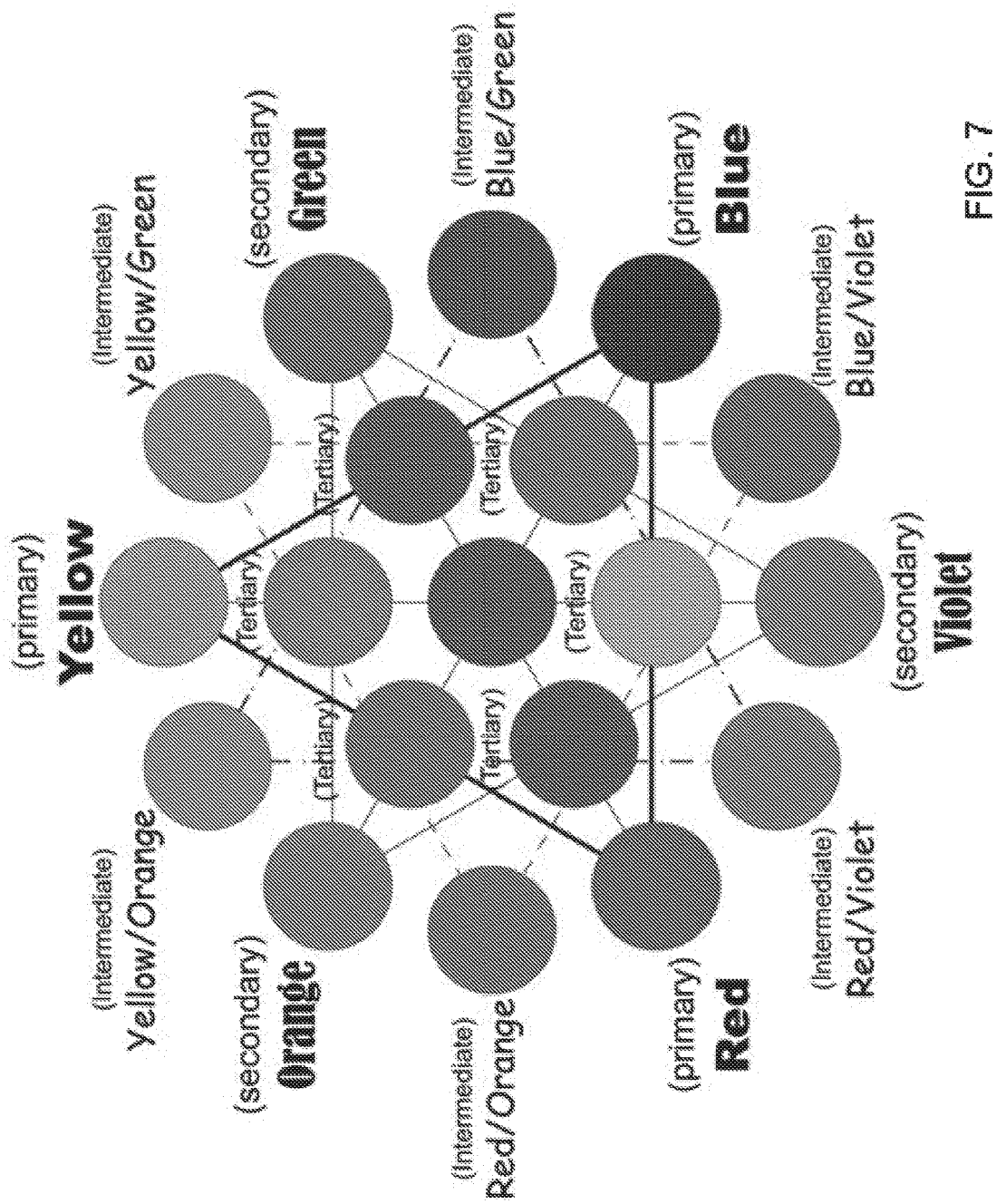
FIG. 7 depicts an exemplary embodiment of how colors may be associated with one another on numerous levels (e.g., primary, secondary, tertiary).

According to an embodiment of the present invention, when multiple users have provided input data related to a stimuli, the associated identifier(s) may be modified to represent the collective response associated with the input data across all users. Since the response may vary among different users, the total, or collective, response can be aggregated into a single identifier. For instance, initial color information (i.e., visual identifier) associated with a stimuli may move towards a second color (e.g., a mix of two or more primary colors) as the aggregate response across all users represents a mixed response (e.g., users did not all have the same response). The resulting aggregate visual identifier may be taken as a true indicator of the response that would be elicited across a group of users if the stimuli were to be so presented. FIG. 7 depicts an exemplary embodiment of how colors may be associated with one another on numerous levels (e.g., primary, secondary, tertiary).

With respect to generating an identifier for a stimuli, the system may draw upon one or more data sources for interpreting input data. For instance, input data that is either text or audio may be processed into its language roots and cross-referenced against one or more vocabulary databases that have visual indicators associated with various words/phrases. These vocabulary databases may be manually provided with identifiers previously associated with specific words/phrases. In order to do this, preferred embodiments of the present invention are configured to break down input data that comprises language data into language component data. Language component data may be either a single word or series of words that are commonly used together and elicit a specific response.

Alternatively, the system may be put through a training phase to build proprietary vocabulary database. For instance, the system may use input data from one or more users by presenting each user with a series of words/phrases to be utilized in the vocabulary database. The input data may be then aggregated for each word, providing an accurate representation of the appropriate identifier for each word. Input data in this case may be, for instance, a primary color or a selection of a color on a color wheel. In certain embodiments, the input data may be augmented with sensor data to verify the accuracy of the user provided input data, such as matching the color selected by the user with biometric data (e.g., heart rate, pupil dilation) received from sensors. The system could determine whether the color provided by the user is in line with the biometric data to ensure the veracity of the response. A preferred embodiment of the training method is detailed later herein.

Further, the system can, in conjunction with the aforementioned vocabulary databases, use information known about words/phrases in the vocabulary databases to automatically associate certain identifiers with words/phrases not previously trained. For instance, the system may use knowledge about synonyms and antonyms associated with an untrained word/phrase to provide appropriate identifier information to such previously untrained word (i.e., synonyms receiving similar identifiers as the underlying word, antonyms receiving opposite or relatively opposing identifiers as the underlying word). Synonym/antonym information may be retrieved from local databases or pulled from third-party providers (e.g., such as via an API). Once identified, the system can store the newly trained information into its vocabulary databases for future use. One of ordinary skill in the art would appreciate that there are numerous types of information that could be used in this manner for the training of otherwise untrained words/phrases, and embodiments of the present invention are contemplated for use with any appropriate training methods.

According to an embodiment of the present invention, the system may be configured to augment identifiers through addition of an intensity level. For instance, input data received from the user can be utilized to determine not only a particular visual identifier, but the intensity of the experienced stimuli may impact the corresponding visual identifier by varying an intensity of the visual identifier. In one embodiment, intensity can be represented through a visual identifier by way of brightness/dullness. Brighter visual identifiers could represent a more intense stimuli response, with a dull visual identifier representing the opposite. In other embodiments, size may be used to denote intensity, with a large visual identifier denoting an intense stimuli response, with a small visual identifier representing the opposite. One of ordinary skill in the art would appreciate that there are numerous methods that could be utilized to represent intensity in a visual identifier, and embodiments of the present invention are contemplate for use with any method for representing intensity.

To continue the example with a visual identifier, in certain embodiments, intensity may be represented in a separate visual identifier. For instance, a color may be used a primary visual identifier, with a secondary visual identifier (e.g., shape) being used to indicate intensity. For instance, the primary visual identifier could be a color (e.g., blue) and the intensity could be represented by a shape (e.g., triangle). In this example, the shape itself could act as a representation of intensity, or features of the shape, such as size of the shape, could be used as a representation of intensity. In still further embodiments, other types of identifiers could be used to represent intensity. For instance, numbers could be used to represent intensity (e.g., scale of 1-10). One of ordinary skill in the art would appreciate that there are numerous secondary visual identifiers and other identifiers that could be utilized to represent intensity in a visual identifier, and embodiments of the present invention are contemplate for use with any method for representing intensity via secondary visual identifiers and other identifiers.

In another embodiments employing visual identifiers, intensity may be represented through opaqueness of the primary visual identifier. For instance, a primary visual identifier may be more or less transparent, depending on intensity. For instance, the primary visual identifier could be nearly transparent when the intensity is low and nearly solid or solid (i.e., opaque) when intensity is high, with varying levels of transparency/opaqueness being used to denote the various levels of intensity in between.

According to an embodiment of the present invention, the system may be further configured to receive input data from third-party providers and process such third-party input data into an aggregate identifier. For instance, a third-party provider may be a repository for text based reviews (e.g., restaurant reviews, travel reviews). The third-party provider could provide the text based reviews to the system (such as via an API) and the system could process each review into an individual and/or combination of identifier(s) and provide an aggregate identifier representing experience across the reviews in total. One of ordinary skill in the art would appreciate that there are numerous types of third-party providers that could provide input data to the system for processing, and embodiments of the present invention are contemplated for use with any type of third-party provider and third-party provider input data type.

Exemplary Embodiments

Figure 4:
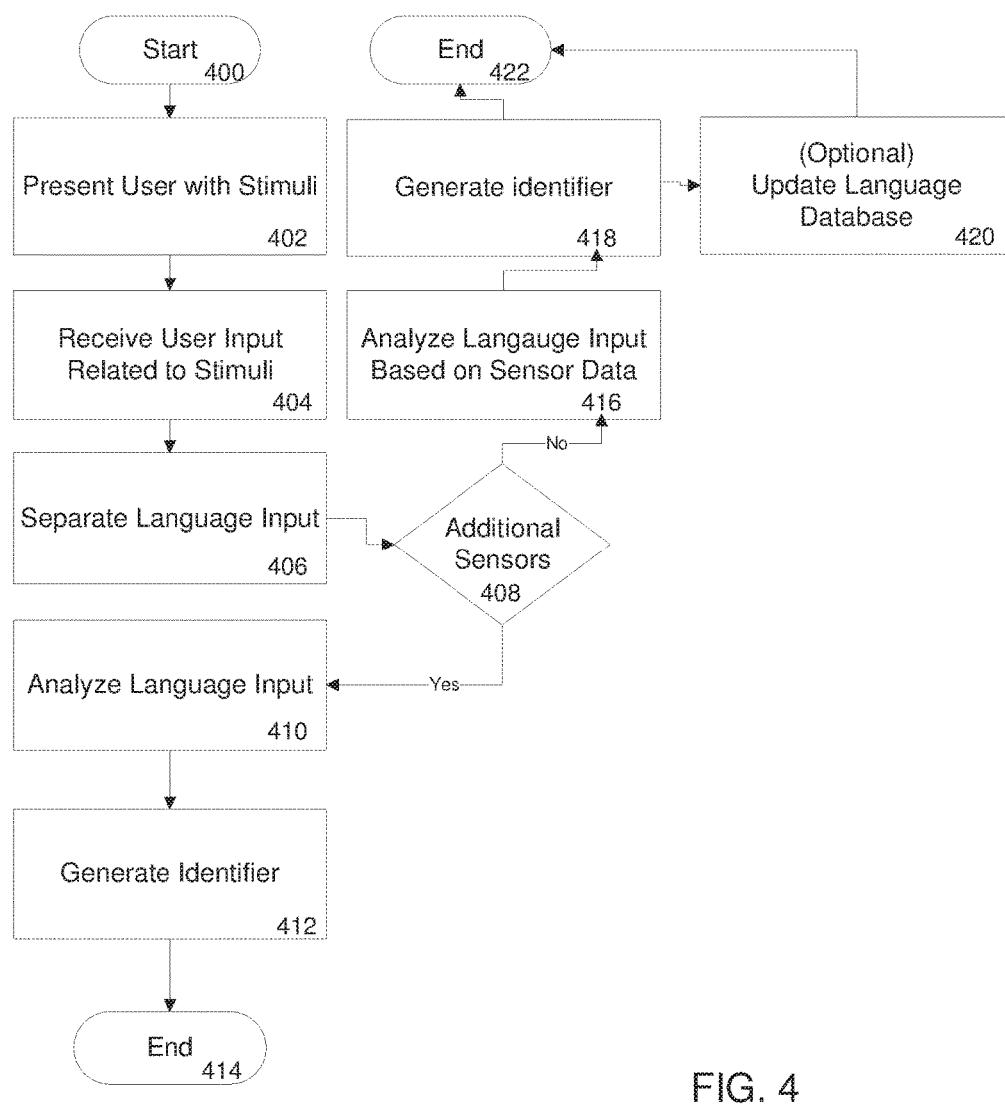
FIG. 4 is a flowchart of an exemplary method in accordance with an embodiment of the present invention.

Turning now to FIG. 4, an exemplary method for providing stimuli, receiving user input and processing input data to generate an identifier is shown. The process starts at step 400 with a user interacting with the system. At step 402, the system provides the user one or more stimuli, as described above herein. In certain embodiments, where the stimuli is related to experiences exterior to the system (e.g., stimuli related to user's experience with an event, item or service), the provision of stimuli may be provided by one or more questions about the exterior stimuli, whether in a qualitative or quantitative manner.

At step 404, the system receives input data from the user, where the input data is associated with the stimuli. As noted above, the input data may be just text based, sensory, haptic, aural, and gustatory data, or any combination thereof. At step 406, the system separates out the input data (i.e., language input) if there are multiple forms of data.

At step 408, the system determines if there is any sensor data, or if the input data solely consists of language input. If only language input is provided, the system proceeds to step 410, where the language input is analyzed. In preferred embodiments, as described above, the language input is generally broken down into individual parts and reviewed against one or more vocabulary databases. Once each portion of the language input is processed, the system generates ab identifier from the processed language input (step 412). At this point the process ends at step 414.

Back at step 408, if the input data includes sensor data, then the system proceeds to step 416, where the system analyzes the language input data (similar to step 410) and augments the processed language input data with sensor data. Sensor data can help add context or otherwise verify the veracity of the language input data provided by a user. At step 418, the system generates an identifier based on the processed language data and sensor data. Optionally at step 420, the system may augment the language/vocabulary database based on the sensor data. This can help to check the veracity of the vocabulary stored in the database and improve results for later processing of stimuli. At this point, the process terminates at step 422.

Turning now to FIGS. 5A-5D, complimentary training methods for perfecting a vocabulary database for use with the system.

FIG. 5A shows a method for providing initial training to a vocabulary database associated with the system. At step 500, the process starts with a request to begin training. At step 502, the system selects a visual identifier to display to the user. In this case, the visual identifier is to be displayed to the user in order to initially associate words with that visual identifier. For instance, if the system wants to build an idea what the color blue means to users, it must first request users associate words/sensor data with that color. While much of this data may be available already, the system can build an aggregate picture by requesting this of numerous users in order to build a solid base for its representation of both stimuli and visual identifiers.

At step 504, the visual identifier is provided to the user. The user then provides input associated with the visual identifier to the system at step 506. The system then associates the input vocabulary (i.e., words/phrases provided by the user that are associated with the visual identifier) (step 508). At step 510, the system can update the vocabulary database(s) and the process will terminate at step 512.

FIG. 5B shows a method for providing individual word training or basic stimuli training for a vocabulary database for the system based on sensor input data. At step 514, the process starts with a request to begin training. At step 516, the system selects a visual identifier to display to the user. In this case, the visual identifier is to be displayed to the user in order to initially associate words with that visual identifier. At step 518, the visual identifier is provided to the user.

At step 520, the system receives the sensor data. The sensor data is then verified and associated with the visual identifier (step 522). In this case, since the visual identifier is being defined, the system can associate biometric or other sensor data with that visual identifier for confirming experienced stimuli with such biometrics or otherwise validating that a visual identifier appropriately represents its underlying vocabulary (e.g., "calm" the word represents a calm state biometrically). At step 524, the system updates the associated vocabulary database(s) and the process terminates at step 526.

Figure 5C:
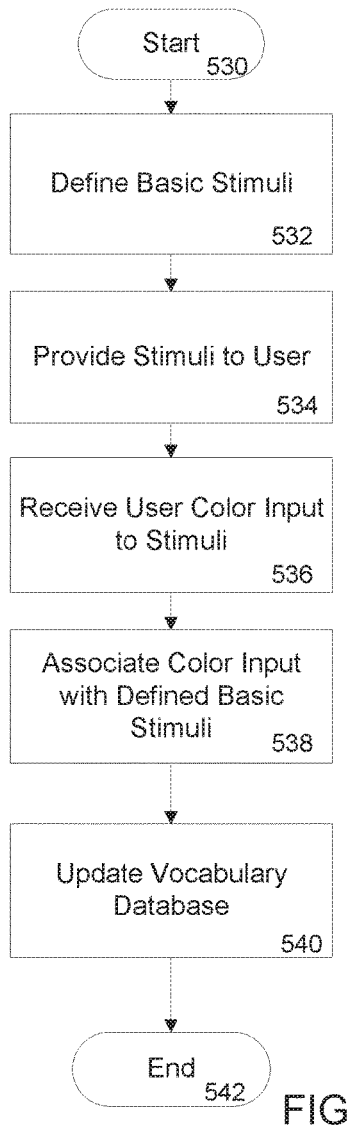
FIG. 5C is a flowchart of an exemplary method in accordance with an embodiment of the present invention.

FIG. 5C shows a method for providing individual word training or basic stimuli training for a vocabulary database associated with the system. At step 530, the process starts with an untrained word or phrase (i.e., untrained stimuli). At step 532, the system defines the basic stimuli. In this case, the basic stimuli may be the word itself or other visual representative of the word (e.g., picture of a horse for the word "horse"). The system then provides the stimuli to the user (step 534).

At step 536, the system receives the user's response to the stimuli, in this format, the input should be a color input (e.g., primary, secondary, tertiary). Once the response is received, the system can then associate the color input with the defined basic stimuli (step 538). At step 540, the system updates the associated vocabulary database(s) and the process terminates at step 542.

Figure 5D:
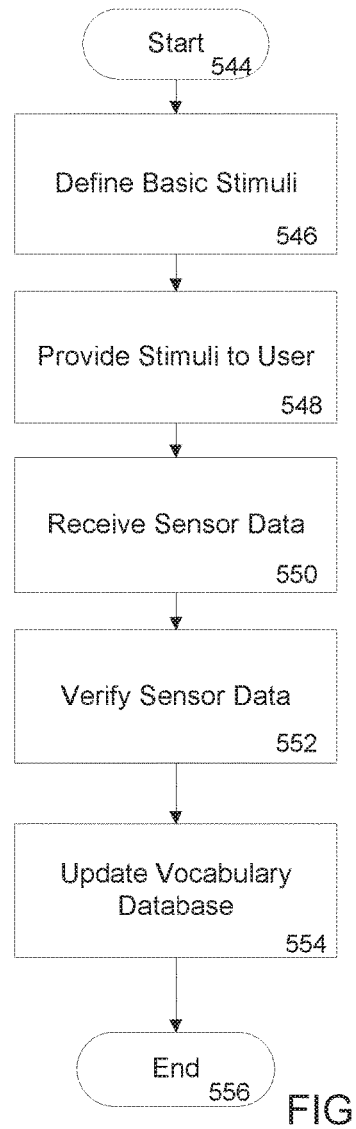
FIG. 5D is a flowchart of an exemplary method in accordance with an embodiment of the present invention.

FIG. 5D shows a method for providing individual word training or basic stimuli training for a vocabulary database for the system based on sensor input data. At step 544, the process starts with an untrained word or phrase (i.e., untrained stimuli). At step 546, the system defines the basic stimuli. In this case, the basic stimuli may be the word itself or other visual representative of the word (e.g., picture of a horse for the word "horse"). The system then provides the stimuli to the user (step 548).

At step 550, the system receives the sensor data. The sensor data is then verified and processed into the appropriate visual indicators (step 552). At step 554, the system updates the associated vocabulary database(s) and the process terminates at step 556.

Figure 6:
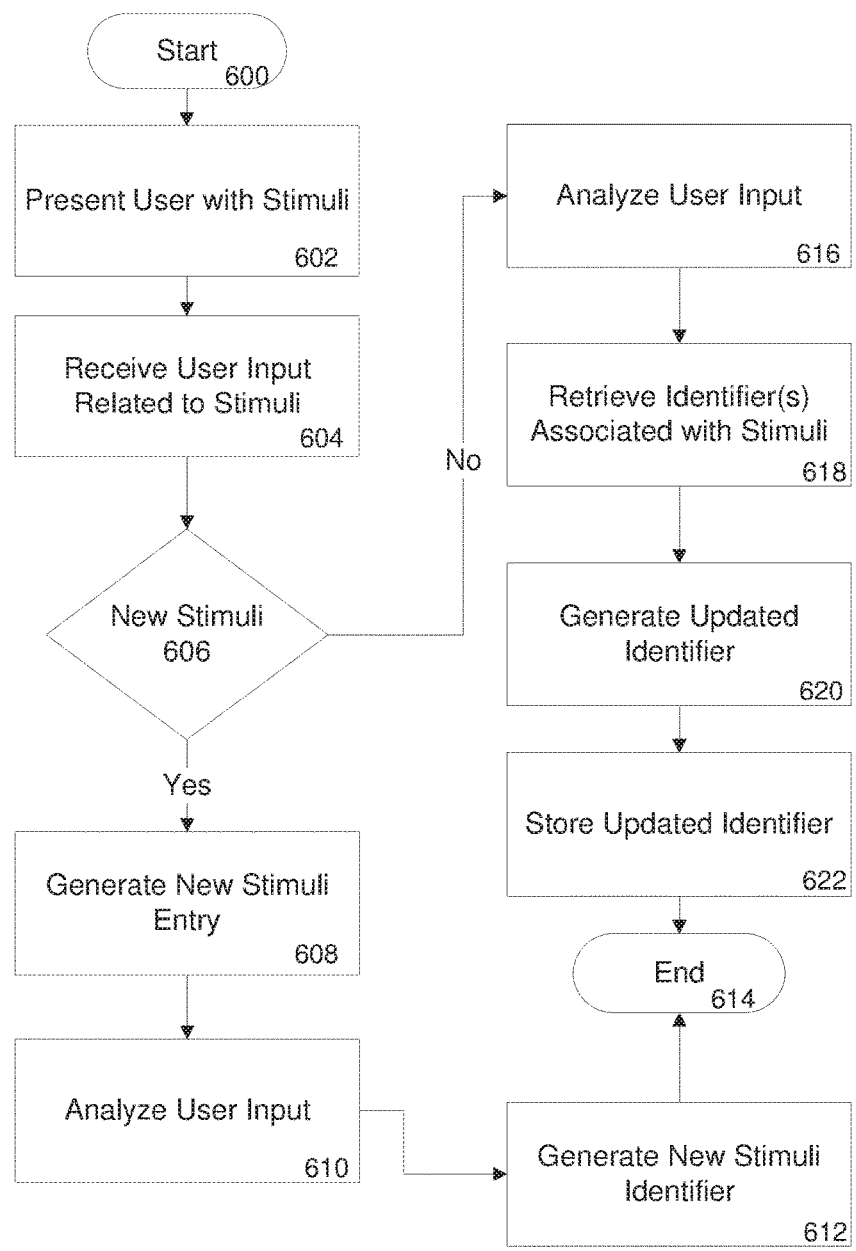
FIG. 6 is a flowchart of an exemplary method in accordance with an embodiment of the present invention.

FIG. 6 shows a process for providing an identifier across an aggregate of responses by a number of users. The process starts at step 600 with a user interacting with the system to provide input. At step 602, the system provides a stimuli to the user.

At step 604, the user receives the stimuli and provides user input related to the stimuli. The system then checks if the stimuli has been previously interacted with or otherwise provided previously (e.g., whether a song has been provided to users previously) (determination step 606. If this is the first time the stimuli has been provided to a user, the system generates a new entry for the stimuli at step 608. The system then analyzes the user input associated with the stimuli as described herein (step 610). At step 612, the system generates an identifier for the stimuli and stores the identifier accordingly. The process then terminates at step 614.

Back at determination step 606, if the stimuli has previously been provided to users, then the system analyzes the current user input at step 616. The system then retrieves the identifier(s) already associated with the stimuli, as generated by the system based on previously received user input (step 618).

At step 620, once the new input data and previously provided identifiers have been received, the system generates a new identifier based on an aggregation of the data. The system can then store the updated identifier associated with the stimuli (step 622) at which point the process will terminate at step 614.

FIGS. 6A-6B are exemplary methods for providing response to stimuli via direct selection of an identifier, whether alone or in conjunction with sensors. Turning first to FIG. 6A, a method for providing response to stimuli via direct selection of an identifier is shown (starting at step 630). At step 632, the process starts with the system providing stimuli to the user as described herein. At step 634, the system further provides the user with an identifier selection tool for receiving input of an identifier representing the user's response to the provided stimuli. For example, a visual identifier selection tool may be a color wheel (see, FIG. 7) with one or more primary colors, secondary colors, tertiary colors, or colors of any depth level. In certain embodiments, the visual identifier selection tool may be limited to fewer color depth levels (e.g., only primary colors).

At step 636, the system receives the user's response to the stimuli. For example, the input may be a color input (e.g., primary, secondary, tertiary) selected from a visual identifier selection tool provided to the user. Once the response is received, the system can then associate the color input with the provided stimuli (step 638). At step 640, the system updates the identifier associated with the stimuli in aggregate and the process terminates at step 642.

FIG. 6B shows a method for providing response to stimuli based on sensor input data. At step 644, the process starts with stimuli to be presented to the user. At step 646, the system provides the stimuli to the user. At step 648, the system receives the sensor data associated with the sensor response occurring during perception of the stimuli by the user. The sensor data is then verified and processed into the appropriate indicators (step 650). At step 652, the system updates the identifier associated with the stimuli in aggregate and the process terminates at step 654.

In terms of application, the system and methods detailed herein can be used by various industries in helping distinguish and represent events, items, goods, services and other stimuli based on identifiers as described herein. By using these identifiers, emotional responses can be elicited from users and improve the understanding of the underlying consumer and the impact such stimuli can have on a market. Further, users can quickly identify via the identifiers which stimuli they would be interested in interacting with based on their own knowledge of what the identifiers correspond to pleasant or otherwise desired stimuli.

In certain embodiments, generation, application and use of the identifiers can allow for instant recognition by users of various stimuli. Users can use this knowledge to interact with various stimuli based on the associated indicator. Since identifiers can be applied to physical products, services and information, the application of identifier consumption can be utilized broadly. Users can select music, art, stories, products, brands, service providers, or any of a number of various classes of goods, services or other content based on one or more visual identifiers.

Specific examples of usage may include, but are not limited to: (i) using identifiers in an online dating service, where information provided by users is processed by the system in accordance with the methods described herein to generate an aggregate identifier for the user which may be used to find compatible partners based on the aggregate identifier; (ii) brand analysis, whereby the system generates an aggregate identifier for a product/service or brand associated with the product or service, with such information being used by the brand owner to manage the reputation of their brand (e.g., making changes to the brand in order to move the brand in a preferred direction that would change the identifier accordingly); and (iii) using identifiers in market analysis scenarios to gauge emotional response to financial transactions (e.g., equities markets, particular stocks) as opposed to financial transactions being made on numbers alone. One of ordinary skill in the art would appreciate that there are numerous use cases for the methods and systems described herein, and embodiments of the present invention are contemplated for any appropriate use.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A web-based system for generating identifiers from user input associated with perceived stimuli, the system comprising:
   an input classification module comprising computer-executable code stored in non-volatile memory;
   an identifier generation module comprising computer-executable code stored in non-volatile memory;
   a communications means comprising computer-executable code stored in non-volatile memory, and
   a processor,
   wherein said input classification module, said identifier generation module, said processor and said communications means are operably connected; and
   wherein said input classification module, said identifier generation module, said processor and said communications means are configured to collectively:
   present a user with a stimuli;
   receive user text-based input related to said stimuli;
   convert said text-based input into language component data;
   analyze said language component data for one or more corresponding identifiers; and
   generate a final identifier based on analysis of said language component data, and
   wherein said input classification module, said identifier generation module, said processor and said communications means are configured to collectively:
   determine if sensor data has been received from one or more sensors associated with the user;
   process said received sensor data into one or more sensor data identifiers;
   compare sensor data identifier with said final identifiers; and
   generate an aggregate identifier, wherein said aggregate identifier is based at least in part on said final identifier and said one or more sensor data identifiers.

2. The web-based system of claim 1, wherein said input is in the form of at least one of a visual, aural, olfactory, gustatory, haptic and sensory input.

3. The web-based system of claim 2, wherein said input classification module, said identifier generation module, said processor and said communications means are further configured to collectively:
   retrieve one or more stored identifiers associated with said stimuli, wherein said identifiers may be in at least one of visual and oral form; and generate an aggregate identifier, wherein said aggregate identifier is based at least in part on said final identifier and said one or more stored identifiers.

4. The web-based system of claim 1, wherein said generated final identifier may be in at least one of a visual and aural form.

5. The web-based system of claim 1, wherein said input classification module, said identifier generation module, said processor and said communications means are further configured to collectively:
    verify said final identifier corresponds to said sensor data identifier;
    update a vocabulary database associated with said identifier generation module based on said sensor data identifier.

6. A web-based method for generating identifiers from user input associated with perceived stimuli, the method comprising the steps of:
    presenting a user with a stimuli;
    receiving user text-based input related to said stimuli;
    converting said text-based input into language component data;
    analyzing said language component data for one or more corresponding identifiers;
    generating a final identifier based on analysis of said language component data;
    receiving sensor data from one or more sensors associated with the user;
    processing said sensor data into one or more sensor data identifiers;
    comparing sensor data identifier with said final identifiers; and
    generating an aggregate identifier, wherein said aggregate visual identifier is based at least in part on said final identifier and said one or more sensor data identifiers.

7. The web-based method of claim 6, wherein said input is in the form of at least one of a visual, aural, olfactory, gustatory, haptic and sensory.

8. The web-based method of claim 6, wherein said generated final identifier may be in at least one of a visual and aural form.

9. The web-based method of claim 6, further comprising the steps of:
    retrieving one or more stored identifiers associated with said stimuli; and
    generating an aggregate identifier, wherein said aggregate identifier is based at least in part on said final identifier and said one or more stored identifiers.

10. The web-based method of claim 6, further comprising the steps of:
    verifying said final identifier corresponds to said sensor data identifier;
    updating a vocabulary database associated with said identifier generation module based on said sensor data identifier.

11. The computer-implemented system of claim 10, wherein said input classification and visual identifier generation module and said processor are further configured to collectively:
    verify said final identifier corresponds to said sensor data identifier;
    update a vocabulary database associated with said identifier generation module based on said sensor data identifier.

12. A computer implemented system for generating identifiers from user input associated with perceived stimuli, the system comprising:
    an input classification and identifier generation module comprising computer-executable code stored in non-volatile memory; and
    a processor,
    wherein said input classification and identifier generation module and said processor are operably connected; and
    wherein said input classification and identifier generation module and said processor are configured to collectively:
    present a user with a stimuli;
    receive user text-based input related to said stimuli;
    convert said text-based input into language component data;
    analyze said language component data for one or more corresponding identifiers; and
    generate a final identifier based on analysis of said language component data, and
    wherein said input classification module, said identifier generation module, said processor and said communications means are configured to collectively:
    determine if sensor data has been received from one or more sensors associated with the user;
    process said received sensor data into one or more sensor data identifiers;
    compare sensor data identifier with said final identifiers; and
    generate an aggregate identifier, wherein said aggregate identifier is based at least in part on said final identifier and said one or more sensor data identifiers.

13. The web-based system of claim 12, wherein said input is the form of at least one of a visual, aural, olfactory, gustatory, haptic or sensory.

14. The web-based system of claim 12, wherein said identifier generation module and generated identifier may be in at least one of a visual and aural form.

15. The computer-implemented system of claim 12, wherein said input classification and identifier generation module and said processor are further configured to collectively:
    retrieve one or more stored identifiers associated with said stimuli; and
    generate an aggregate identifier, wherein said aggregate identifier is based at least in part on said final identifier and said one or more stored identifiers.

* * * * *